United States Patent
Rubinshteyn

(10) Patent No.: US 10,311,257 B2
(45) Date of Patent: Jun. 4, 2019

(54) LABORATORY INSTRUMENT

(71) Applicant: HANS HEIDOLPH GMBH, Kelheim (DE)

(72) Inventor: Sergiy Rubinshteyn, Nuremberg (DE)

(73) Assignee: Hans Heidolph GmbH, Keilheim (DE)

( * ) Notice: Subject to any disclaimer, the term of this patent is extended or adjusted under 35 U.S.C. 154(b) by 67 days.

(21) Appl. No.: 15/536,056

(22) PCT Filed: Dec. 16, 2015

(86) PCT No.: PCT/EP2015/080036
§ 371 (c)(1),
(2) Date: Jul. 13, 2017

(87) PCT Pub. No.: WO2016/097008
PCT Pub. Date: Jun. 23, 2016

(65) Prior Publication Data
US 2017/0372098 A1    Dec. 28, 2017

(30) Foreign Application Priority Data
Dec. 17, 2014   (DE) .................. 10 2014 118 853

(51) Int. Cl.
*G06K 7/08* (2006.01)
*F04B 43/12* (2006.01)
*F04B 43/00* (2006.01)
*G06K 19/06* (2006.01)

(52) U.S. Cl.
CPC .......... *G06K 7/087* (2013.01); *F04B 43/0081* (2013.01); *F04B 43/12* (2013.01); *G06K 19/06196* (2013.01)

(58) Field of Classification Search
None
See application file for complete search history.

(56) References Cited

U.S. PATENT DOCUMENTS

| | | | |
|---|---|---|---|
| 5,749,885 A | * | 5/1998 | Sjostrom .......... A61B 17/32002 604/22 |
| 2004/0217885 A1 | | 11/2004 | Hudman et al. |
| 2010/0209263 A1 | * | 8/2010 | Mazur .................... F04B 43/084 417/321 |
| 2015/0192234 A1 | * | 7/2015 | Fries ...................... F16L 37/004 285/9.1 |
| 2016/0084879 A1 | * | 3/2016 | Luo ....................... G01R 1/0416 324/127 |

FOREIGN PATENT DOCUMENTS

| | | |
|---|---|---|
| DE | 3226939 | 7/1982 |
| DE | 102009024606 | 12/2010 |
| DE | 102010002133 | 8/2011 |
| WO | WO 2004057190 | 8/2004 |

* cited by examiner

*Primary Examiner* — Clayton E. LaBalle
*Assistant Examiner* — Jas A Sanghera
(74) *Attorney, Agent, or Firm* — Wiggin and Dana LLP; Gregory S. Rosenblatt; Andrew D. Bochner

(57) ABSTRACT

The invention relates to a laboratory device, in particular to a peristaltic pump, having an accessory part, in particular a pump head, that is removably arranged at the laboratory device; and having an apparatus for an automatic recognition of the accessory part from a plurality of accessory parts, in particular mutually different pump heads, removably arrangeable at the laboratory device, wherein the recognition apparatus has a coding at the accessory side and a detection unit for detecting the coding at the laboratory device side.

19 Claims, 1 Drawing Sheet

LABORATORY INSTRUMENT

Figure 1A:
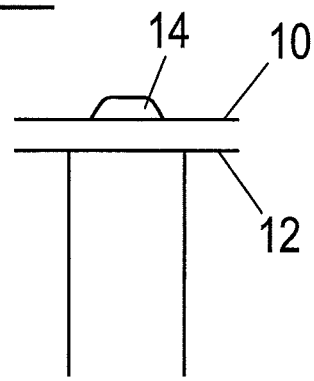

The invention relates to a laboratory device, in particular to a peristaltic pump, having an accessory part, in particular a pump head, that is removably and/or replaceably arranged at the laboratory device.

Peristaltic pumps are generally known. Different pump heads that differ, for example, with respect to their conveying speeds and/or conveying quantities can be attached to these pumps. The pump heads can also be single-passage pump heads or multi-passage pump heads. Typical conveying quantities are in the range from 0.3 to 4,200 ml per minute for single-passage pump heads or 0.005 to 400 ml per minute and passage for multi-passage pump heads.

In conventional peristaltic pumps, on a change of the pump head, the user has to correspondingly manually set or adapt the construction type of the new pump head used and/or operating parameters of the peristaltic pump for operation with the new pump head. If this is accidentally omitted, the peristaltic pump will be operated with incorrect flow quantities.

An incorrect association of an accessory part can also prove to be disadvantageous with other laboratory devices and can in particular result in damage to the laboratory device or in an operation with incorrect parameters.

It is therefore an object of the invention to provide a laboratory device having an accessory part in which a replacement of the accessory part is efficient and simple.

This object is satisfied by a laboratory device having an accessory part having the features of the independent claims.

In accordance with an aspect of the invention, the laboratory device having the accessory part comprises an apparatus for an automatic recognition of the accessory part from a plurality of accessory parts, in particular mutually different pump heads, that are removably arrangeable at the laboratory device. Not only the pump head for a peristaltic pump or of a peristaltic pump can preferably be automatically recognized in this manner, but also any other components or accessory parts for any desired laboratory devices.

The recognition apparatus has a coding at the accessory side and a detection unit for detecting the coding at the laboratory device side.

Since the accessory part is automatically recognized with the aid of the coding, a user does not, for example, have to set the type of the pump head manually. In this manner, the user friendliness and the efficiency on a change of the pump head or of the construction type of the pump head are substantially increased.

A mechanical coding is generally also possible as the coding in which in particular a specific arrangement of pins or the like can be provided that can be recognized by the detection unit, in particular an arrangement of a corresponding mating coding.

The detection unit is, however, preferably configured to detect the coding in a contactless manner. The IP protection class of the laboratory device and of the accessory part can in particular be maintained in this manner despite the recognition apparatus since no mechanical elements have to be led through a housing of the laboratory device or of the accessory part and there is thus unchanged protection from contact and the penetration of water and grime into the housing.

Like accessory parts or accessory parts of the same construction can have the same coding while accessory parts of different kinds or different kinds of construction can have codings differing from one another. For example, the same or identical pump heads can be replaced with one another and the associated setting at the peristaltic pump can be maintained in this case. If, however, the pump heads differ from one another, this can be detected using the coding and the pump can be set accordingly.

Further developments of the invention can also be seen from the dependent claims, the description and the enclosed drawings.

In accordance with an embodiment, the recognition apparatus is a recognition apparatus that works contactlessly and is based on a magnetic coding. No additional openings are thus necessary in a housing of the laboratory device and/or of the accessory part to detect the coding.

In accordance with a further embodiment, the coding comprises at least one magnet, in particular a permanent magnet, and the detection unit comprises a magnetic field sensor, in particular a Hall sensor, preferably associated with the respective magnet. They can e.g. be inexpensive standard components. An electromagnet can generally also be used as the magnet. A coding via a magnetic field strength can take place comparatively precisely in this respect. Electromagnets have to be supplied with power, however. It is generally conceivable that a single magnetic field sensor is associated with a plurality of magnets, i.e. detects a plurality of magnets. A separate magnetic field sensor, in particular a Hall sensor, is, however, preferably associated with each magnet so that the detection can take place in a particularly simple and easily distinguishable manner. The Hall sensor can in particular have an analog signal output or voltage output. The coding can furthermore also comprise a lack of a magnet.

In accordance with a further embodiment, the coding comprises a state of the permanent magnet that relates to the position and/or to the orientation of the permanent magnet. A permanent magnet can thus adopt different states. A state can result from a combination of a specific position with a specific orientation.

In accordance with a further embodiment, the position of the permanent magnet comprises at least a first spacing or a second spacing from the laboratory device. In general, more than two different spacings from the laboratory device are also conceivable so that the number of generally possible codings and thus the number of mutually distinguishable types of construction of accessory parts can be increased. Since a reduction of the mutual spacing between the individual spacings will typically accompany the number of generally possible spacings from the laboratory device becoming larger, when inexpensive permanent magnets are used whose magnetic field strengths often have high production tolerances, resolution problems can result so that higher value permanent magnets should be used in this case. It generally applies that a clear distinguishability of the different spacings from one another should be ensured by the detection unit.

In accordance with a further embodiment, the permanent magnet is oriented such that the north pole or the south pole of the permanent magnet faces the laboratory device. For example, a total of four different state combinations results in this respect in combination with two different spacings from the laboratory device. The permanent magnet can generally also adopt any desired other and/or further discrete orientations, with their distinguishability in turn being ensured by the detection unit.

In accordance with a further embodiment, the coding comprises states of a plurality of magnets, in particular permanent magnets. A plurality of magnets are thus preferably provided per accessory part, whereby the total number of possible state combinations is considerably increased.

The plurality of magnets are in particular spaced apart from one another so that they preferably do not mutually influence one another. The detection unit can in particular comprise a corresponding number of a plurality of magnetic field sensors, in particular Hall sensors, associated with the respective magnet. It is, however, generally also conceivable that a magnetic field sensor is associated with a plurality of magnets.

In accordance with a further embodiment, the coding per magnet comprises one of five possible states. In this respect, a state can in particular comprise a lack of the magnet, a positioning of the magnet at a first spacing from the laboratory device, with the north pole of the magnet facing the laboratory device; a positioning of the magnet at a first spacing from the laboratory device, with the south pole of the magnet facing the laboratory device; a positioning of the magnet at a second spacing from the laboratory device, with the north pole of the magnet facing the laboratory device; or a positioning of the magnet at a second spacing from the laboratory device, with the south pole of the magnet facing the laboratory device.

A lack of a magnet at a corresponding position can thus also be used for the coding. If a plurality of magnets are provided, five state combinations thus result per magnet. With n magnets, $5^n$ possible state combinations consequently result. It is, however, preferred if the case that not a single magnet is present, is not used for recognizing an accessory part so that then a total of $5^n-1$ mutually different components can be recognized. By way of example, on the use of two magnets, 25 possible state combinations result, i.e. 24 different accessory parts can be recognized.

In accordance with a further embodiment, at least one magnet is positioned at a first spacing from the laboratory device and at least one magnet is positioned at a second spacing from the laboratory device. The reliability of the recognition of a coding can be increased in this manner. If namely all the magnets are at the same spacing from the laboratory device, at least substantially the same magnetic field strength value is detected for all the magnets so that a comparison of this value with a predefined reference value is necessary to determine whether the magnets are all located at the first spacing or they are all located at the second spacing from the laboratory device. If a systematic error occurs in this respect, for example in the form of an offset, it may no longer be possible to reliably determine the spacing at which the magnets are arranged. Since at least one magnet is located at each spacing, a relative reference is created. The position of the respective magnets can be reliably determined by the magnetic field strengths that differ due to the different spacings. The number of possible state combinations is reduced by this condition since the two states that all the magnets are at the first spacing or at the second spacing are precluded.

In accordance with a further embodiment, the recognition apparatus comprises an evaluation unit, in particular a microcontroller, associated with the respective magnetic field sensor that is configured to evaluate a output signal of the magnetic field sensor corresponding to a strength of the magnetic field of the respective magnet. If, for example, no magnet is present, the output voltage of a Hall sensor can be equal to half the supply voltage of the Hall sensor. Alternatively, the zero point can also be selected differently so that, for example, no output voltage is measured if no magnet is present. If a magnet is provided, in contrast, a total of four different voltage levels that can be evaluated result in dependence on the orientation of the magnet and on the spacing from the laboratory device. The output voltage of the Hall sensor is in this respect in particular recognized and evaluated by the microcontroller. The respective states can thus be detected in a simple manner and the laboratory device can be set accordingly.

In accordance with a further embodiment, a housing of the accessory part and/or a housing of the laboratory device comprises, at least in the effective region of the magnet, a material that at least substantially does not influence the strength of the magnetic field or a non-metallic material, a non-magnetic material and/or a non-ferromagnetic material. The field of the magnet is consequently not screened or is only slightly screened and is thus easily detectable by the magnetic field sensor.

In accordance with a further aspect, the invention relates to an apparatus for an automatic recognition of an accessory part, in particular a pump head, removably and/or replaceably arranged at a laboratory device, in particular at a peristaltic pump, from a plurality of accessory parts, in particular mutually different pump heads, removably and/or replaceably arranged at the laboratory device, wherein the recognition apparatus has a coding at the accessory side and a detection unit for detecting the code at the laboratory device side.

In accordance with a further aspect, the invention relates to a set of mutually different accessory parts, in particular pump heads, removably and/or replaceably arrangeable at a laboratory device, in particular at a peristaltic pump, wherein the accessory parts each have a coding, with the codings differing from one another; and wherein the respective coding is detectable by a detection unit of the laboratory device to automatically recognize the respective accessory part from a set of accessory parts. Different accessory parts can in this respect have different codings, while accessory parts that are the same or identical can have the same coding.

The further developments described in connection with the laboratory device having an accessory part in accordance with the invention can also be transferred to the apparatus in accordance with the invention for an automatic recognition of an accessory part removably and/or replaceably arranged at a laboratory device from a plurality of accessory parts removably arrangeable at the laboratory device and to the set in accordance with the invention of mutually different accessory parts removably arrangeable at a laboratory device.

Figure 1B:
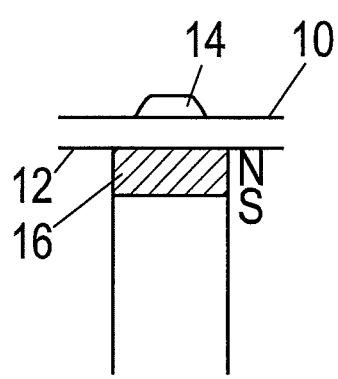
Figure 1C:
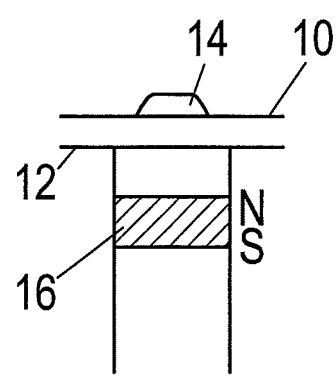
Figure 1D:
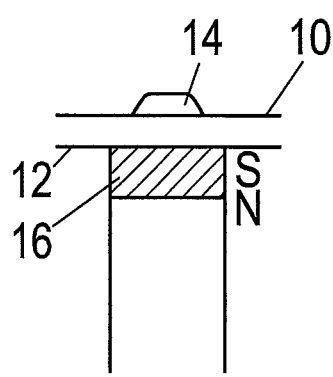
Figure 1E:
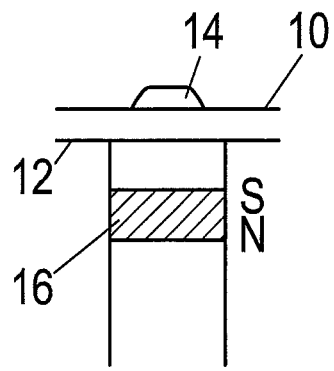
Figure 2:
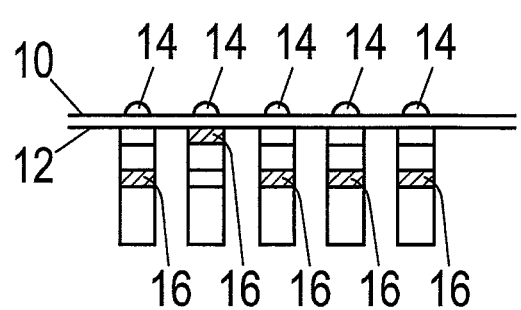

The invention will be described in the following by way of example with reference to the drawings. There are shown:

FIGS. 1A to E schematic sectional views of different accessory parts arranged at a laboratory device in accordance with the invention each having different codings; and FIG. 2 a schematic sectional view of an accessory part arranged at a laboratory device in accordance with the invention having a coding comprising a plurality of magnets.

A housing of a laboratory device configured, for example, as a peristaltic pump 10 is shown in FIG. 1B. A respective removable accessory part configured as a pump head 12, of which only the housing is likewise shown, is arranged at the pump 10. The peristaltic pump 10 comprises a magnetic field sensor configured as a Hall sensor 14 and serving as a detection unit that is configured to detect a magnetic field of a permanent magnet 16 arranged in the pump head 12. A coding of the pump head 12 arranged at the peristaltic pump 10 takes place by the selected spacing of the permanent magnet 16 from the peristaltic pump 10 and from the selected orientation of the permanent magnet 16 relative to the peristaltic pump 10. The components that serve for the recognition of the pump head 12 at the peristaltic pump 10 can also be correspondingly used with other accessory parts and other laboratory devices.

The five pump heads 12 shown in FIGS. 1A to 1E are pump heads 12 of five mutually different construction types with which the shown peristaltic pump 10 is respectively operable. The different pump head construction types can, for example, differ with respect to their conveying speeds and/or conveying quantities and/or by whether they are single-passage or multi-passage pump heads. Provision is made in this respect that the codings of the different pump head construction types differ from one another by a variation of the spacing of the respective permanent magnet 16 from the peristaltic pump 10 and of the orientation of the respective permanent magnet 16 relative to the peristaltic pump 10 (FIG. 1B to FIG. 1E) or that the permanent magnet 16 is fully omitted (FIG. 1A). Pump heads 12 of the same construction generally have the same coding, pump heads 12 of different construction types have mutually different codings.

No magnet is provided in the first pump head 12 in FIG. 1A. The output voltage of the Hall sensor 14 is in this respect set such that it corresponds to half the supply voltage of the Hall sensor 14. Based on this, a first state is recognized in the form of a non-presence of a permanent magnet with the aid of a microprocessor, not shown. The pump head 12 of the first construction type is recognized.

A permanent magnet 16 whose north pole N faces the pump 10 is provided in the second pump head 12 in FIG. 1B. The magnet 16 is located in a first position, comparatively close to the pump 10. A second voltage characteristic for this state results at the Hall sensor 14. A second state can be detected in this manner and the pump head 12 of the second construction type can thus be recognized.

In accordance with FIG. 1C, the magnet 16 of the third pump head 12 is arranged in a second position that is further remote from the pump 10 than in FIG. 1B. The orientation is identical, however; i.e. the north pole N also faces the pump 10 here. A third output voltage results due to the different spacing in this respect so that a third state is determined and the pump head 12 of the third construction type can be recognized.

The magnet 16 of the fourth pump head 12 is oriented in FIG. 1D such that the south pole S faces the pump 10. The magnet 16 is located in the second position as in FIG. 1B in this respect. A fourth state can be detected by the fourth voltage measured at the Hall sensor 14 and the pump head 12 of the fourth construction type can thereby be recognized.

Finally, the south pole S of the magnet 16 of the fifth pump head 12 faces the pump 10 in FIG. 1E (as in FIG. 1D) and the magnet 16 is in the same position (as in FIG. 1C). A fifth voltage thus results at the Hall sensor 14 so that a fifth state can be determined and the fifth pump head 12 can be recognized.

If therefore a specific pump head 12 is placed onto the peristaltic pump 10, the Hall sensor 14 generates a voltage characteristic for the respective coding of the pump head 12 with reference to which it can be automatically recognized which pump head 12 or which pump head construction type is connected to the peristaltic pump 10. The peristaltic pump 10 can then be automatically adapted to an operation with the respective detected pump head 12 or with the respective detected pump head construction type. A pump head change is particularly user-friendly and efficient in this manner.

Provision can generally also be made that the pump heads 12 each have more than one magnet 16 in order thereby to increase the number of different coding possibilities. If, for example, n Hall sensors are provided at a peristaltic pump and if n permanent magnets are provided at a pump head, a total of $5^n$ state combinations thus result so that $5^n$ or $5^n-1$ (for the case that the coding without a single magnet is not used) possible construction types can be recognized.

A pump head 12 is shown in FIG. 2 that has a coding with five magnets 16. The second magnet 16, viewed from the left, is in this respect at a first spacing from the pump 10 and the remaining magnets 18 are at a common second spacing from the pump 10 that is greater than the first spacing. A separate Hall sensor 14 is associated with each magnet 16 for detecting the respective magnetic field strength at the pump 10. The Hall sensor 14 that is associated with the magnet 16 at the first spacing detects a first magnetic field strength and the remaining Hall sensors 16 detect a second magnetic field strength that is smaller than the first magnetic field strength. Since at least one magnet 16 is arranged in the direct vicinity of the pump 10 and at least one magnet 16, four magnets 16 here, is/are arranged further spaced from the pump 10, a comparison of the respective detected magnetic field strength with a predefined reference value can be dispensed with for determining whether a respective magnet 16 is located at a first spacing or at a second spacing from the pump 10. It can rather be determined by a comparison of the respective detected magnetic field strength with the other detected magnetic field strengths whether a respective magnet 16 is at the first spacing or at the second spacing from the Hall sensor 14.

REFERENCE NUMERAL LIST 10 peristaltic pump
12 pump head
14 Hall sensor
16 permanent magnet
N north pole
S south pole

The invention claimed is:

1. A peristaltic pump, the peristaltic pump comprising:
an accessory part that is removably arranged at the laboratory device; and an apparatus for an automatic recognition of the accessory part from a plurality of accessory parts, with the plurality of accessory parts being able to be removably arranged at the laboratory device,
wherein the recognition apparatus has a coding at the accessory and a detection unit for detecting the coding at the laboratory device, wherein the coding comprises states of a plurality of magnets, the states comprising one of five possible states.

2. The peristaltic pump having the accessory part in accordance with claim 1, wherein the accessory part is a pump head.

3. The peristaltic pump having the accessory part in accordance with claim 1, wherein the plurality of accessory parts are mutually different pump heads.

4. The peristaltic pump having the accessory part in accordance with claim 1, wherein the recognition apparatus is a recognition apparatus that works contactlessly.

5. The peristaltic pump having the accessory part in accordance with claim 4, wherein the recognition apparatus is based on a magnetic coding.

6. The peristaltic pump having the accessory part in accordance with claim 1, wherein the coding comprises at least one magnet; and wherein the detection unit comprises at least one magnetic field sensor.

7. The peristaltic pump having the accessory part in accordance with claim 6, wherein the at least one magnetic field sensor is associated with the respective at least one magnet.

8. The peristaltic pump having the accessory part in accordance with claim 6, wherein the at least one magnet is a permanent magnet.

9. The peristaltic pump having the accessory part in accordance with claim 8, wherein the coding comprises a state of the permanent magnet that relates to the position and/or orientation of the permanent magnet.

10. The peristaltic pump having the accessory part in accordance with claim 9, wherein the position of the permanent magnet comprises at least a first spacing or a second spacing from the laboratory device.

11. The peristaltic pump having the accessory part in accordance with claim 9, wherein the permanent magnet is oriented such that the north pole or the south pole of the permanent magnet faces the laboratory device.

12. The peristaltic pump having the accessory part in accordance with claim 6, wherein the at least one magnetic field sensor is a Hall sensor.

13. The peristaltic pump having the accessory part in accordance with claim 1, wherein the plurality of magnets are spaced apart from one another.

14. The peristaltic pump having the accessory part in accordance with claim 1, wherein the detection unit comprises a corresponding number of a plurality of magnetic field sensors associated with respective magnet from the plurality of magnets.

15. The peristaltic pump having the accessory part in accordance with claim 1,
wherein the five possible states are selected from the group of members consisting of:
a lack of the magnet;
a positioning of the magnet at a first spacing from the laboratory device, with the north pole of the magnet facing the laboratory device;
a positioning of the magnet at a first spacing from the laboratory device, with the south pole of the magnet facing the laboratory device;
a positioning of the magnet at a second spacing from the laboratory device, with the north pole of the magnet facing the laboratory device; and
a positioning of the magnet at a second spacing from the laboratory device, with the south pole of the magnet facing the laboratory device.

16. The peristaltic pump having the accessory part in accordance with claim 1, wherein at least one magnet is positioned at a first spacing from the laboratory device and at least one magnet is positioned at a second spacing from the laboratory device.

17. The peristaltic pump having the accessory part in accordance with claim 1, wherein the recognition apparatus comprises an evaluation unit associated with a respective magnetic field sensor, the evaluation unit being configured to evaluate an output signal of the magnetic field sensor corresponding to a strength of a magnetic field of a respective magnet.

18. The peristaltic pump having the accessory part in accordance with claim 1, wherein at least one of a housing of the accessory part and a housing of the laboratory device comprises, at least in an effective region of a magnet, a material that at least substantially does not influence the strength of the magnetic field.

19. The peristaltic pump having the accessory part in accordance with claim 18, wherein the material that at least substantially does not influence the strength of the magnetic field is selected from the group of members consisting of a non-metallic material, a non-magnetic material, a non-ferromagnetic material and combinations of the foregoing.

* * * * *